Aug. 25, 1959  Z. A. M. BURRESON  2,901,587
UTILITY APPLIANCE COOKER
Filed April 14, 1958  2 Sheets-Sheet 1

INVENTOR.
ZINA A. M. BURRESON
BY Woodling & Krost

Aug. 25, 1959   Z. A. M. BURRESON   2,901,587
UTILITY APPLIANCE COOKER
Filed April 14, 1958   2 Sheets-Sheet 2
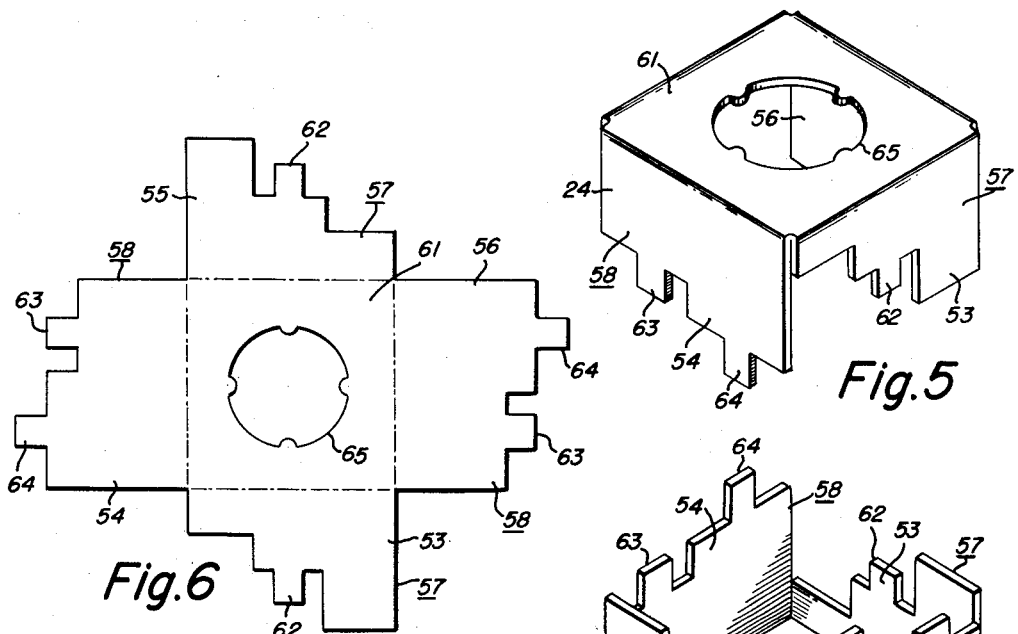
Fig.5
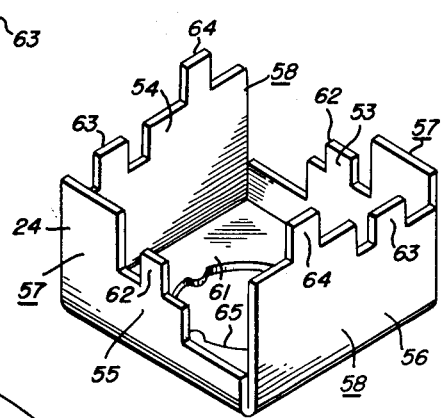
Fig.4
Fig.6
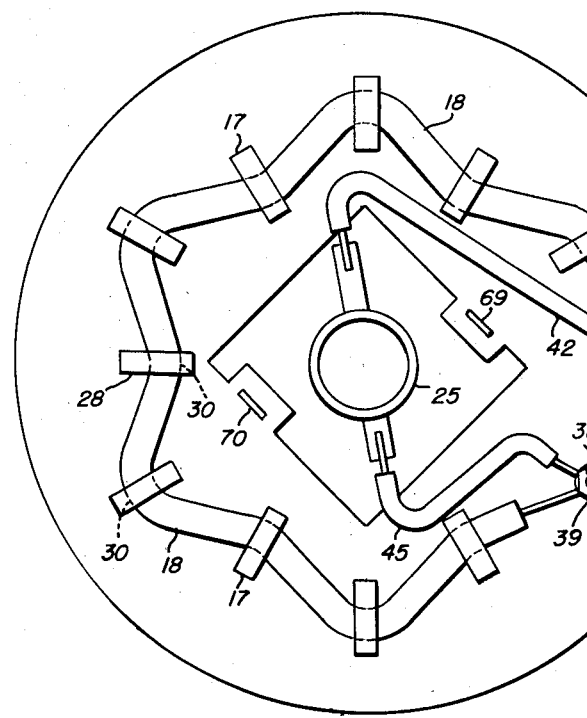
Fig.2
INVENTOR.
ZINA A. M. BURRESON
BY
Woodling & Krost

United States Patent Office 2,901,587
Patented Aug. 25, 1959

2,901,587

UTILITY APPLIANCE COOKER

Zina A. M. Burreson, Mansfield, Ohio, assignor to Dominion Electric Corporation

Application April 14, 1958, Serial No. 728,193

8 Claims. (Cl. 219—44)

This invention relates to electric appliances and more particularly to popcorn poppers and the like.

An object of the invention is to provide a popcorn popper with a snap action thermostat contained inside a housing member and at a predetermined temperature reached in the corn popper for the thermostat to open and limit the current flow in a standard heating element.

Another object of the invention is to provide a housing member with a mounting portion, the mounting portion having an opening therein and attached to the center bottom portion of the bowl of the popcorn popper so the thermostat will be in heat conducting relation with the bowl, thus the thermostat will record more precisely and rapidly the heat given off by the bowl.

Another object of my invention is to provide a corn popper that will "shut off" at the exact time that all the corn is popped, therefore leaving no un-popped corn of burnt corn in the bottom of the bowl.

Another object of my invention is to provide a housing member with twist tabs mounted thereon to engage slits in various pre-assembled parts of the popcorn popper to securely fasten the various pre-assembled parts together to form a one piece unit.

Figure 1:
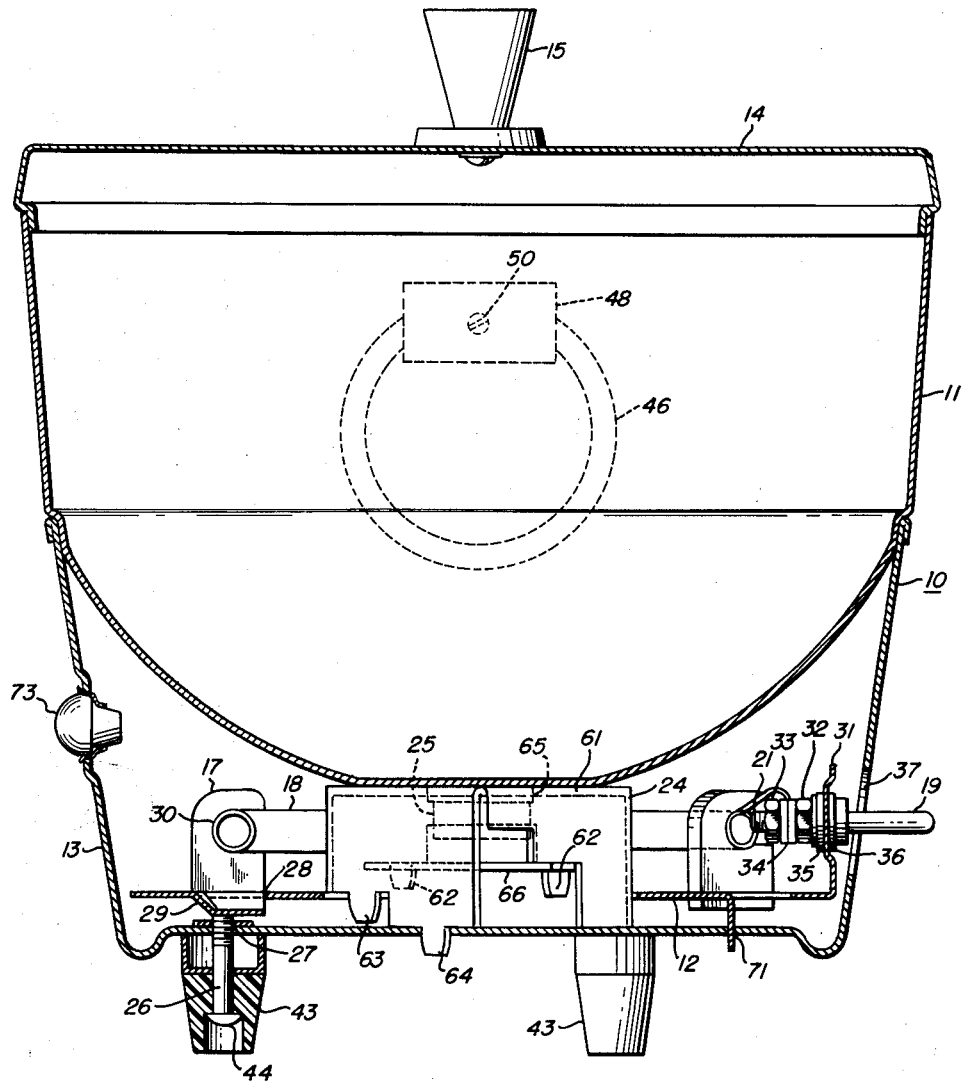
Figure 3:
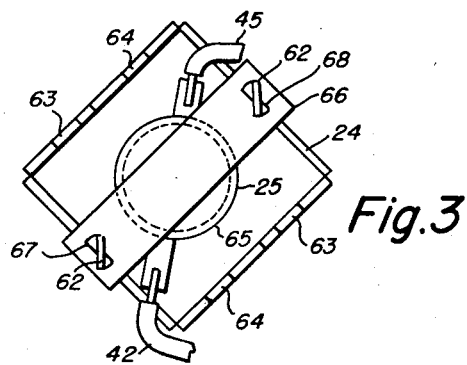

Other objects and a better understanding of the invention may be had by referring to the following description and claims, taken in conjunction with the accompanying drawing, in which:

Figure 1 of the drawings is a cross-sectional view showing the popcorn popper utilized in my invention;

Figure 2 of the drawings is a plan view showing the element plate and the parts mounted thereon;

Figure 3 of the drawings is a plan view showing the snap-action thermostat residing in a housing member embodied in the popcorn popper;

Figure 4 of the drawings is an isometric view of the interior of the housing member embodied in the popcorn popper;

Figure 5 of the drawings is an isometric view of the outside of the housing member embodied in the popcorn popper; and Figure 6 is a plan view of the housing member before the housing member is folded along the dotted lines.

The popcorn popper shown in Figure 1 is designated by the reference character 10 and may be used to pop corn and also as a utility cooker for cooking various types of food and other material. The popcorn popper 10 comprises a substantially circular bowl 11, an element plate 12, and a substantially circular enclosure pan 13 to enclose the element plate 12 therein. A lid 14 is used to cover the top portion of the bowl 11 to keep the popping corn or other food contained therein. The lid 14 has a handle 15 attached thereon to facilitate the cover and removal of the lid 14 from the bowl 11. The bowl 11 has attached thereon two handles 46 to facilitate the handling of the corn popper 10. The two handles 46 consist of circular metal rings which engage two insulating portions 48, respectively. The two insulating portions 48 are fastened to the bowl by means of two screws 50, respectively, and the insulating members 48 prevent heat from the bowl 11 from conducting to the handles 46.

The enclosure pan 13 has mounted on its base thereof three legs 43 constructed of a non-conducting material. It is understood that any number of legs may be employed in the invention. The legs 43 are primarily to prevent the base of the enclosure pan 13 from contacting a burnable surface and to enable the corn popper 10 to stand upright. The legs 43 are attached to the base of the enclosure pan 13 by means of screws 44 extending through an opening 26 in the legs 43 and through a threadable opening 27 in the base of the enclosure pan 13.

Mounted in the wall portion of the enclosure pan 13 is a jewel assembly 73 which consists of a piece of red translucent glass. When a heating element 18 is heated, it turns a bright red color, and the red color is transmitted through the translucent glass and enables the user to determine when the heating element 18 is "on" or "off."

With specific reference to Figure 2 of the drawings, the element plate 12 is constructed of a flat metal disc and has mounted thereon a plurality of element bushings 17, a heating element 18, two terminal pins 19 and 20, and three connecting terminals 21, 22 and 23.

The element plate 12 has a plurality of rectangular openings 28 therein, evenly spaced apart from one another and defining a substantially circular path. On the bottom portion of the element plate 12 are fastened metal bushing holders 29. The bushings 17 are constructed to fit into the openings 28 of the element plate 12 and reside against the metal bushing holders 29, enabling the bushings 17 to stand upright. The bushings 17 are constructed from a non-conducting material such as porcelain although any other material may be used. The bushings 17 have semi-circular openings 30 therein and are placed in the openings 28 of the element plate 12 so that the semi-circular openings 30 are oppositely disposed in relation to one another. The heating element 18 comprises a tightly coiled low resistance wire to heat up rapidly when current is passed through it. The bushings 17 are aligned as described above to hold the heating element 18 in a substantially circular path to effectively heat the bowl 11 at an even temperature throughout enabling the popcorn or food contained therein to cook at an even rate.

Mounted on a portion of the outside rim of the element plate 12 is a metal flange 31 which is perpendicular to the element plate 12. On the inward portion of the metal flange 31 are mounted two current conducting connecting terminals 21 and 22. Each of the terminals 21 and 22 are substantially circular and have threads thereon. Mounted on the threads of the terminals 21 and 22 are two hexagonal nuts 32 and 33, respectively, which engage therebetween a current conducting metal washer 34. Mounted between the inward portion of the metal flange 31 and the two nuts 32 is an insulating mica washer 35 to insulate the element plate 12. On the outward portion of the metal flange 31 are mounted two circular current conducting terminal pins 19 and 20. Mounted against the outward portion of the flange 31 is an insulating mica washer 36 used also to insulate the element plate 12. The terminal pins 19 and 20 extend through a substantially elliptical opening 37 in the enclosure pan 13 and engage openings in a cord plug which leads to an outlet plug to supply an incoming current to the popcorn popper 10. A single curent conducting connecting terminal 23 is also located on the element plate 12 and is electrically insulated therefrom. The terminal 23 consists of a screw 38 which has mounted thereon a hexagonal nut 39 which engages a current conducting metal washer 41. One end of the heating element 18 is connected to the washer 34 of the connecting terminal 21.

The other end of the heating element 18 is connected to the metal washer 41 of the connecting terminal 23. Connected to the terminal 22 is a conducting wire 42 which is connected to one lead of a snap-action thermostat 25. Connected to the other lead of the thermostat 25 is a similar conducting wire 45 which also connects to the washer 41 of the terminal 23, thus forming a complete circuit. Again with specific reference to Figure 2, the current enters through the terminal pin 19, flows to the metal washer 34, through the heating element 18, to the connecting washer 41 of the terminal 23, through conductor 45, through the snap-action thermostat 25, through conductor 42, to the metal washer 34 of the terminal 22 and to terminal pin 20, completing the circuit. The thermostat 25 is connected in series with the heating element 18 thus, when the thermostat 25 is open, no current can flow through the heating element 18.

With specific reference to Figures 3, 4, 5 and 6 of the drawings, a housing member is identified by the reference character 24. The housing member 24 is constructed of four walls 53, 54, 55 and 56. It is understod that any number of walls may be used in the construction of the housing member 24, but it is desirable and sufficient in this particular invention to use only four walls. The walls 53 and 55 are substantially similar in construction and shape and the walls 54 and 56 are likewise similar in construction and shape. The walls 53 and 55 shall henceforth be referred to as a first set of walls and designated by the reference character 57. The walls 54 and 56 shall henceforth be referred to as a second set of walls and designated by the reference character 58. The first set of walls 57 are oppositely disposed to one another and the second set of walls 58 are likewise oppositely disposed to one another, and each set of walls 57 and 58 have a tab-edge portion and a top portion. Attached to the top portion of the first and second set of walls 57 and 58 is a mounting portion 61 which is spot welded to the center bottom portion of the bowl 11 to form a one-piece member. The tab edge portion of the first set of walls 57 has two substantially identical tabs 62 attached thereon. The tab edge portion of the second set of walls 58 has two substantially identical sets of twist tabs 63 and 64 attached thereon. The twist tabs 62, 63 and 64 are at different elevations with respect to each other, thus the tab-edge portion of the first and second set of walls 57 and 58 forms a step-like construction. The twist tabs are constructed to engage openings or slits in the piece to be connected and to extend through the opening. Then the twist tabs are twisted by an outside pressure to form a permanent connection. The mounting portion 61 has a circular opening 65 therein which allows part of center bottom portion of the bowl 11 to be exposed.

The snap-action thermostat 25 is enclosed in the housing member 24 and held in place by metal strip 66 engaging the bottom portion of the thermostat 25. The metal strip 66 has two substantially identical slits 67 and 68 at each end thereof. The two twist tabs 62 of the housing member 24 engage the two slits 67 and 68 to hold the metal strip 66 in place. The thermostat 25 is constructed so that the top of the thermostat fits into the opening 65 of the mounting portion 61 and therefore is in heat conducting relation with the bowl 11. This enables the thermostat 25 to record more precisely and rapidly the heat given off by the bowl 11. The thermostat is designed to open at a predetermined temperature reached in the bowl 11 which limits the current flow through the heating element 18. When the predetermined temperature is reached, the thermostat will open, thus breaking the circuit at the exact time that all the corn contained in the bowl 11 has popped. Thus there will be no scorched or uncooked corn in the bottom of the bowl 11 as sometimes occurs in other corn poppers of a similar nature.

The element plate 12 has therein two substantially identical slits 69 and 70 and the two twist tabs 63 of the housing member 24 engage the slits 67 to 70 to attach the element plate 12 to the housing member 24. The base of the enclosure pan 13 also has two substantially identical slits one of which being not shown and the other being identified by the reference number 71 and the twist tabs 64 of the housing member 24 engage these slits and attach the enclosure pan 13 to the bowl 11. Thus the different parts of the corn popper 10 may be fastened securely to one another with just a twist of the tabs 62, 63 and 64, and if so desired, may be disassembled with the same facility used in assembly of the corn popper 10.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. An electric corn popper receiving a current to operate same and comprising in combination, a bowl having a center bottom portion, an element plate having mounted thereon a heating element, a housing member containing therein a snap-action thermostat in heat conducting relation with said bowl to control said heating element, an enclosure pan to enclose therein said element plate and said housing member, said housing member having a mounting portion secured to said center bottom portion of said bowl, said housing member having attached to said mounting portion a first set of substantially similar walls oppositely disposed to one another and a second set of substantially similar walls oppositely disposed to one another, each of said walls having a tab-edge portion, said tab-edge portion of said first set of walls having a plurality of first twist tabs attached thereon, said tab-edge portion of said second set of walls having a plurality of second and third twist tabs attached thereon, said first, second and third twist tabs at different elevations with respect to each other, a metal strip having slits at each end thereof, said first twist tabs engaging said slits of said metal strip to hold said metal strip in place, said metal strip engaging said snap-action thermostat to hold same in said housing member and in heat conducting relation to said bowl, said element plate having a plurality of slits therein to receive said second twist tabs to attach said element plate to said housing member, said heating element and said snap-action thermostat connected in series to form a circuit path, said thermostat designed to open at a predetermined temperature reached in said bowl to limit current flow through said heating element, said enclosure pan having a plurality of slits to receive said third twist tabs of said housing member to fasten said enclosure pan to said bowl and enclose said element plate and said housing member therein.

2. An electric corn popper receiving a current to operate same and comprising in combination, a container to hold popcorn, an element plate having mounted thereon heating means, a housing member containing therein a regulating means in heat conducting relation with said container to control said heating means, enclosure means to enclose therein said element plate and said housing member, said housing member having a mounting portion secured to said container, said housing member having attached to said mounting portion a first set of substantially similar walls opposiely disposed to one another and a second set of substantially similar walls oppositely disposed to one another, each of said walls having a tab-edge portion, said tab-edge portion of said first set of walls having a plurality of first twist tabs attached thereon, said tab-edge portion of said second set of walls having a plurality of second and third twist tabs attached thereon, said first, second and third twist tabs at different elevations with respect to each other, a metal strip having slits at each end thereof, said first twist tabs engaging said slits of said metal strip to hold said metal strip in place, said metal strip engaging said regulating means to hold same in said housing member and in heat conducting relation to said container, said element plate having a plurality of slits therein to receive said second twist tabs to attach said element plate to said housing member, said regulating means and said heating means connected in series to form a circuit path, said regulating means designed to open at a predetermined temperature reached in said container to limit current flow through said heating means, said enclosure means having a plurality of slits to receive said third twist tabs of said housing member to fasten said enclosure means to said container and enclose said element plate and said housing member therein.

3. An electric appliance receiving a current to operate same and comprising in combination, a container to hold material to be heated, an element plate having mounted thereon a heating means, a housing member containing therein a regulating means in heat conducting relation with said container to control said heating means, enclosure means to enclose therein said element plate and said housing member, said housing member having a mounting portion secured to said container, said housing member having attached to said mounting portion a first set of substantially similar walls oppositely disposed to one another and a second set of substantially similar walls oppositely disposed to one another, each of said walls having a tab-edge portion, said tab-edge portion of said first set of walls having a plurality of first twist tabs attached thereon, said tab-edge portion of said second set of walls having a plurality of second and third twist tabs attached thereon, said first, second and third twist tabs at different elevations with respect to each other, a metal strip having slits at each end thereof, said first twist tabs engaging said slits of said metal strip to hold said metal strip in place, said metal strip engaging said regulating means to hold same in said housing member and in heat conducting relation to said container, said element plate having a plurality of slits therein to receive said second twist tabs to attach said element plate to said housing member, said heating means and said regulating means connected in series to form a circuit path, said regulating means designed to open at a predetermined temperature reached in said container to limit current flow through said heating means, said enclosure means having a plurality of slits to receive said third twist tabs of said housing member to fasten said enclosure means to said container and enclose said element plate and said housing member therein.

4. A housing member containing therein a snap-action thermostat in heat conducting relation with a container holding material to be heated and being heated by a heating element supplied with a current, a mounting plate to support said heating element, an enclosure member to enclose therein said mounting plate, said heating element, said housing member and said thermostat, said housing member having a mounting portion secured to said container, said housing member having attached to said mounting portion a first set of substantially similar walls oppositely disposed to one another and a second set of substantially similar walls oppositely disposed to one another, each of said walls having a tab-edge portion, said tab-edge portion of said first set of walls having a plurality of first twist tabs attached thereon, said tab-edge portion of said second set of walls having a plurality of second and third twist tabs attached thereon, said first, second and third twist tabs at different elevations with respect to each other, a metal strip having slits at each end thereof, said first twist tabs engaging said slits of said metal strip to hold said metal strip in place, said metal strip engaging said snap-action thermostat to hold same in said housing member and in heat conducting relation to said container, said mounting plate having slits therein to receive said second twist tabs to attach said mounting plate and said heating element to said housing member, said thermostat designed to open at a predetermined temperature reached in said container to limit current flow through said heating elements, said enclosure member having a plurality of slits to receive said third twist tabs of said housing member to fasten said enclosure member to said container to enclose said mounting plate, said heating element, said housing member and said thermostat therein.

5. A housing member containing therein a regulator in heat conducting relation with a container holding material to be heated and being heated by a heating element supplied with a current, a mounting member to support said heating element, an enclosure member to enclose therein said mounting member, said heating element, said housing member and said regulator, said housing member having a mounting portion secured to said container, said housing member having attached to said mounting portion a plurality of walls, each of said walls having a tab-edge portion, said tab-edge portion of said walls having a plurality of twist tabs attached thereon, said plurality of twist tabs at different elevations with respect to each other, a metal strip having a plurality of slits therein, said twist tabs engaging said slits of said metal strip to hold said metal strip in place, said metal strip engaging said regulator to hold same in said housing member and in heat conducting relation to said container, said mounting member having a plurality of slits therein to receive said twist tabs to attach said mounting member and said heating element to said housing member, said thermostat designed to open at a predetermined temperature reached in said container to limit current flow through said heating element, said enclosure member having a plurality of slits to receive said twist tabs of said housing member to fasten said enclosure member to said container to enclose said mounting member, said heating element, said housing member and said regulator therein.

6. A housing member containing therein a regulating means in heat conducting relation with a container holding material to be heated and being heated by heating means supplied with a current, a mounting means to support said heating means, an enclosure means to enclose therein said mounting means, said heating means, said housing member and said regulating means, said housing member having a mounting portion secured to said container, said housing member having attached to said mounting portion a plurality of walls, each of said walls having a gripping portion, said gripping portion of said walls having a plurality of gripping means attached thereon, fastening means having receiving means, said gripping means engaging said receiving means of said fastening means to hold said fastening means in place, said fastening means engaging said regulating means to hold same in said housing member and in heat conducting relation to said container, said mounting member having receiving means to receive said gripping means to attach said mounting means and said heating means to said housing member, said regulating means designed to open at a predetermined temperature reached in said container to limit current flow through said heating means, said enclosure means having receiving means to receive said gripping means of said housing member to fasten said enclosure means to said container to enclose said mounting means, said heating means, said housing member and said regulating means therein.

7. An electric corn popper receiving a current to operate same and comprising in combination, a container to hold popcorn, an element plate having mounted thereon heating means, a housing member containing therein a regulator in heat conducting relation with said container to control said heating means, enclosure means to enclose therein said element plate and said housing member, said housing member having a mounting portion secured to said container, said housing member having attached to said mounting portion a plurality of spaced walls, each of said walls having a tab-edge portion, said tab-edge portion of said walls having a plurality of twist tabs attached thereon, said plurality of twist tabs at different elevations with respect to each other, a metal strip having a plurality of slits therein, said twist tabs engaging said slits of said metal strip to hold said metal strip in place, said metal strip engaging said regulator to hold same in said housing member and in heat conducting relation to said container, said element plate having a plurality of slits therein to receive said twist tabs to attach said element plate to said housing member, said regulator designed to open at a predetermined temperature reached in said container to limit current flow through said heating means, said enclosure means having a plurality of slits therein to receive said twist tabs of said housing member to fasten said enclosure means to said container and enclose said element plate and said housing member therein.

8. An electric appliance receiving a current to operate same and comprising in combination, a container to hold material to be heated, a mounting means having mounted thereon heating means, a housing member containing therein regulating means in heat conducting relation with said container to control said heating means, enclosure means to enclose therein said mounting means and said housing member, said housing member having a mounting portion secured to said container, said housing member having attached to said mounting portion a plurality of spaced walls, each of said walls having a gripping portion, said gripping portion of said walls having gripping means attached thereon, fastening means having receiving means, said gripping means engaging said receiving means of said fastening means to hold said fastening means in place, said fastening means engaging said regulating means to hold same in said housing member and in heat conducting relation to said container, said mounting means having receiving means to receive said gripping means to attach said mounting means to said housing member, said regulating means designed to open at a predetermined temperature reached in said container to limit current flow through said heating means, said enclosure means having receiving means to receive said gripping means of said housing member to fasten said enclosure means to said container and enclose said mounting means and said housing member therein.

No references cited.